(12) United States Patent
Okada et al.

(10) Patent No.: US 6,378,381 B1
(45) Date of Patent: Apr. 30, 2002

(54) SENSOR USING CAPACITANCE ELEMENT

(75) Inventors: Kazuhiro Okada; Hiromichi Itano; Nobumitsu Taniguchi, all of Ageo (JP)

(73) Assignee: Wacoh Corporation, Saitama (JP)

( * ) Notice: Subject to any disclaimer, the term of this patent is extended or adjusted under 35 U.S.C. 154(b) by 0 days.

(21) Appl. No.: 09/502,505

(22) Filed: Feb. 11, 2000

(30) Foreign Application Priority Data

Mar. 1, 1999 (JP) ............................................. 11-052957

(51) Int. Cl.[7] ......................... G01D 7/00; G01P 15/125
(52) U.S. Cl. ...................... 73/862.043; 73/514; 73/32; 73/780
(58) Field of Search ...................... 73/504.11, 862.043, 73/504.02, 780, 514.32

(56) References Cited

U.S. PATENT DOCUMENTS 5,856,620 A * 1/1999 Okada ..................... 73/514.32
6,158,291 A * 12/2000 Okada ................... 73/862.043

* cited by examiner

Primary Examiner—Benjamin R. Fuller
Assistant Examiner—Octavia Davis
(74) Attorney, Agent, or Firm—Ladas & Parry

(57) ABSTRACT

A bottom fixed layer 110, displacement layer 125, and top fixed layer 130 are fixed in a layered structure by way of intervening pedestals 145, 155, which serve as spacers between the layers. The bottom and top fixed layers 110, 130 are rigid dielectric substrates. The displacement layer 125 is a flexible conductive substrate. On the top of the bottom fixed layer 110 are formed an electrode E11 on the right, electrode E12 on the left, and a washer-shaped electrode E15 in the middle. On the bottom of the top fixed layer 130 are formed an electrode E21 on the right, electrode E22 on the left, and a washer-shaped electrode E25 in the middle. These electrodes and the displacement layer 125 together form capacitance elements C11 to C25. When acceleration acts on the working body 160, the displacement layer 125 is displaced and a change in capacitance occurs in various capacitance elements. The X-axis acceleration component can then be calculated as (C11+C22) −(C12+C21), and the Z-axis acceleration component can be calculated as C25−C15.

18 Claims, 12 Drawing Sheets

SENSOR USING CAPACITANCE ELEMENT

BACKGROUND OF THE INVENTION

The present invention relates to a sensor for detecting force or acceleration, and relates particularly to a capacitance sensor for detecting force or acceleration in a particular axial direction in an XYZ three-dimensional coordinate system using a capacitance element.

Force sensors and acceleration sensors are used in numerous industrial devices as a means of detecting a particular physical quantity, and as an input device for use with digital devices. Sensors using capacitance elements (capacitance sensors) in particular are used as a low cost data capturing and input device for use with computer devices because of their simple construction and ability to reduce cost.

Capacitance sensors for detecting force or acceleration use a capacitance element of which the electrode gap is changed by the force or acceleration being detected, and detect the desired force or acceleration based on the change in the capacitance of this element. More recent sensors of this type use a plurality of capacitance elements arrayed at specific locations to separately detect a desired two-dimensional or three-dimensional force or acceleration component. U.S. Pat. No. 5,406,848 and U.S. Pat. No. 5,421,213, for example, teach the basic principle of a multi-dimensional capacitance sensor for detecting force, acceleration, or magnetism.

A problem with the various capacitance sensors of the related art is, however, that interference between different detection axes occurs when detecting force or acceleration along a specific detection axis. A multi-dimensional capacitance sensor typically has a dedicated capacitance element along each detection axis with each said element independently outputting a detection value. During actual sensor operation, however, the detected value is affected slightly by the action of the force or acceleration component on an axis other than the intended detection axis of the sensor. This makes it necessary to implement some corrective measure, such as providing a compensation circuit for cancelling the effect of interference between force or acceleration components on different axes. Such measures ultimately complicate the overall structure of the device, and increase production cost.

SUMMARY OF THE INVENTION

The object of the present invention is therefore to provide a sensor using capacitance element for obtaining by means of a simple construction an accurate detection value with no interference from another detection axis.

(1) The first feature of the present invention resides in a capacitance sensor using a capacitance element for detecting force or acceleration in a specific axis direction in an XYZ three-dimensional coordinate system having an X-axis, a Y-axis and a Z-axis, comprising:

a bottom fixed layer and a top fixed layer fixed with a specific gap therebetween and with surfaces thereof parallel to an XY plane and intersected by the Z-axis;

a displacement layer disposed between the bottom fixed layer and the top fixed layer so as to maintain a reference state substantially parallel to the XY plane under conditions in which a force or an acceleration is not at work, and to displace from the reference state when a force or an acceleration is at work;

a working body connected to a part of the displacement layer for causing displacement of the displacement layer based on an action of force or acceleration;

a positive X-axis bottom electrode formed on a top surface of the bottom fixed layer at a position corresponding to a positive region of the X-axis;

a negative X-axis bottom electrode formed on a top surface of the bottom fixed layer at a position corresponding to a negative region of the X-axis;

a positive X-axis top electrode formed on a bottom surface of the top fixed layer at a position corresponding to the positive region of the X-axis;

a negative X-axis top electrode formed on a bottom surface of the top fixed layer at a position corresponding to the negative region of the X-axis;

a displacement electrode formed on a bottom surface of the displacement layer at a position corresponding to the positive X-axis bottom electrode;

a displacement electrode formed on a bottom surface of the displacement layer at a position corresponding to the negative X-axis bottom electrode;

a displacement electrode formed on a top surface of the displacement layer at a position corresponding to the positive X-axis top electrode; and a displacement electrode formed on a top surface of the displacement layer at a position corresponding to the negative X-axis top electrode;

where a positive X-axis bottom capacitance element is formed by the positive X-axis bottom electrode and an opposing displacement electrode;

a negative X-axis bottom capacitance element is formed by the negative X-axis bottom electrode and an opposing displacement electrode;

a positive X-axis top capacitance element is formed by the positive X-axis top electrode and an opposing displacement electrode;

a negative X-axis top capacitance element is formed by the negative X-axis top electrode and an opposing displacement electrode; and a detection means having a function for detecting a force or an acceleration acting in an X-axis direction based on a difference between a sum of a capacitance of the positive X-axis bottom capacitance element and a capacitance of the negative X-axis top capacitance element, and a sum of a capacitance of the negative X-axis bottom capacitance element and a capacitance of the positive X-axis top capacitance element.

(2) The second feature of the present invention resides in a capacitance sensor described in the first feature, further comprising:

a positive Y-axis bottom electrode formed on a top surface of the bottom fixed layer at a position corresponding to a positive region of the Y-axis;

a negative Y-axis bottom electrode formed on a top surface of the bottom fixed layer at a position corresponding to a negative region of the Y-axis;

a positive Y-axis top electrode formed on a bottom surface of the top fixed layer at a position corresponding to the positive region of the Y-axis;

a negative Y-axis top electrode formed on a bottom surface of the top fixed layer at a position corresponding to the negative region of the Y-axis;

a displacement electrode formed on a bottom surface of the displacement layer at a position corresponding to the positive Y-axis bottom electrode;

a displacement electrode formed on a bottom surface of the displacement layer at a position corresponding to the negative Y-axis bottom electrode;

a displacement electrode formed on a top surface of the displacement layer at a position corresponding to the positive Y-axis top electrode; and a displacement electrode formed on a top surface of the displacement layer at a position corresponding to the negative Y-axis top electrode;

where a positive Y-axis bottom capacitance element is formed by the positive Y-axis bottom electrode and an opposing displacement electrode;

a negative Y-axis bottom capacitance element is formed by the negative Y-axis bottom electrode and an opposing displacement electrode;

a positive Y-axis top capacitance element is formed by the positive Y-axis top electrode and an opposing displacement electrode; and a negative Y-axis top capacitance element is formed by the negative Y-axis top electrode and an opposing displacement electrode; and the detection means has a further function for detecting a force or an acceleration acting in a Y-axis direction based on a difference between a sum of a capacitance of the positive Y-axis bottom capacitance element and a capacitance of the negative Y-axis top capacitance element, and a sum of a capacitance of the negative Y-axis bottom capacitance element and a capacitance of the positive Y-axis top capacitance element.

(3) The third feature of the present invention resides in a capacitance sensor described in the first or second feature, wherein the bottom electrodes and the top electrodes are symmetrical to the XZ plane or YZ plane.

(4) The fourth feature of the present invention resides in a capacitance sensor described in the third feature, where the capacitance elements are all electrode pairs having the same shape, same size, and same electrode gap.

(5) The fifth feature of the present invention resides in a capacitance sensor described in the first to fourth feature, further comprising:

a bottom origin-surrounding electrode formed around a point of origin on a top surface of the bottom fixed layer;

a top origin-surrounding electrode formed around a point of origin on a bottom surface of the top fixed layer;

a displacement electrode formed on a bottom surface of the displacement layer at a position opposing the bottom origin-surrounding electrode; and a displacement electrode formed on a top surface of the displacement layer at a position opposing the top origin-surrounding electrode;

where a bottom origin-surrounding capacitance element is formed by the bottom origin-surrounding electrode and an opposing displacement electrode, and a top origin-surrounding capacitance element is formed by the top origin-surrounding electrode and an opposing displacement electrode; and the detection means has a further function for detecting force or acceleration acting in the Z-axis direction based on a difference between a capacitance of the bottom origin-surrounding capacitance element and a capacitance of the top origin-surrounding capacitance element.

(6) The sixth feature of the present invention resides in a capacitance sensor described in the fifth feature, wherein the bottom origin-surrounding electrode and the top origin-surrounding electrode are rotationally symmetrical to the Z-axis.

(7) The seventh feature of the present invention resides in a capacitance sensor described in the sixth feature, wherein the origin-surrounding capacitance elements are electrode pairs having the same shape, same size, and same electrode gap.

(8) The eighth feature of the present invention resides in a capacitance sensor described in the first to seventh feature, wherein a first part of the displacement layer is affixed to the bottom fixed layer and top fixed layer, a second part of the displacement layer is connected to the working body, a third part of the displacement layer located between the first part and second part is made of a flexible material such that displacement of the displacement layer occurs with deflection of the third part.

(9) The ninth feature of the present invention resides in a capacitance sensor described in the first to eighth feature, wherein a plurality of displacement electrodes formed on the displacement layer are comprised of a single physical common electrode.

(10) The tenth feature of the present invention resides in a capacitance sensor described in the ninth feature, wherein a flexible, conductive substrate is used as the displacement layer, and the displacement layer itself is used as the single common electrode.

(11) The eleventh feature of the present invention resides in a capacitance sensor described in the ninth or tenth feature, wherein the non-common electrodes of each capacitance element pair for which it is necessary to obtain a sum of capacitance values are electrically connected to each other at a connection node, and a capacitance between the connection node and the common electrode is used as the sum.

(12) The twelfth feature of the present invention resides in a capacitance sensor described in the eleventh feature, wherein a through-hole is formed in the bottom fixed layer and the top fixed layer at each electrode forming position to be connected, and a pair of electrodes to be connected is connected using a wiring layer by way of the through-hole.

(13) The thirteenth feature of the present invention resides in a capacitance sensor described in the first to twelfth feature, wherein a perimeter of the bottom fixed layer and a perimeter of the top fixed layer are fastened by a pedestal, a perimeter of the displacement layer is fastened by the pedestal, the working body is connected to a top center part of the displacement layer, and a through-hole for passing through the working body is formed in a center part of the top fixed layer.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a section through the X-axis of this base layer 10;

DESCRIPTION OF THE PREFERRED EMBODIMENTS

The preferred embodiments of the present invention are described below with reference to the accompanying figures.

<1>A Capacitance Sensor According to the Related Art

First, the basic structure and operation of a typical multi-dimensional capacitance sensor according to the related art is described below with reference to FIG. 1.

Figure 1:
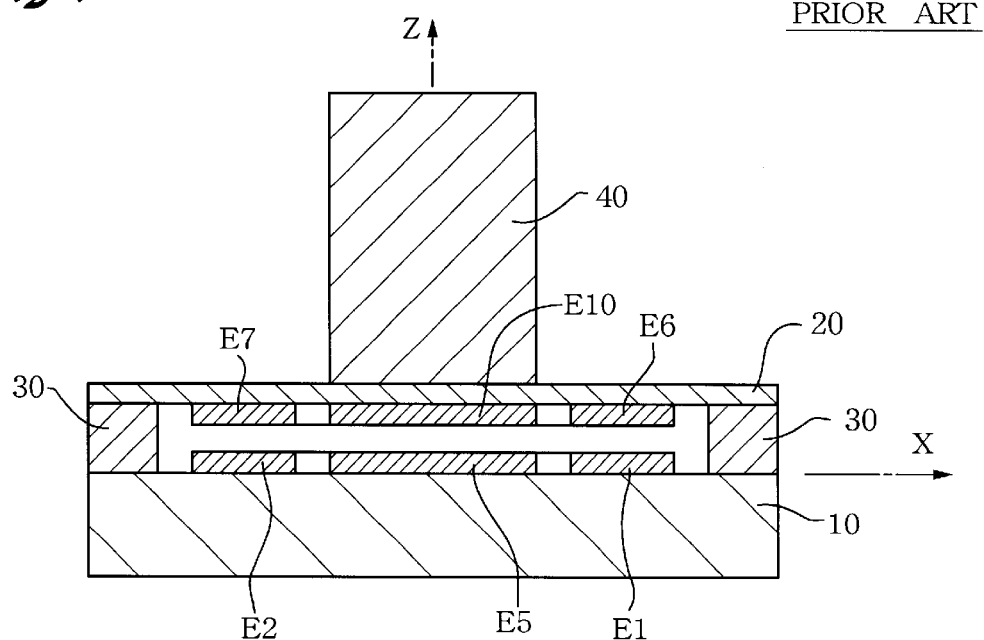
FIG. 1 is a side section view of a conventional mass manufacturable three-dimensional capacitance acceleration sensor.

FIG. 1 is a side section view of a conventional mass manufacturable three-dimensional acceleration sensor using capacitance element according to the related art. As shown in FIG. 1, a base layer 10 and a displacement layer 20 are disposed opposite to each other with a specific gap therebetween. The base layer 10 and the displacement layer 20 are connected to each other by means of intervening pedestals 30, which serve as spacers. It is to be noted that in this exemplary sensor the base layer 10 and the displacement layer 20 are both square substrates made from a suitable dielectric material. The base layer 10 has thickness sufficient to provide overall rigidity, and the displacement layer 20 is relatively thin and somewhat flexible. A columnar weighted body 40 is further connected at the top middle of the displacement layer 20.

Figure 2:
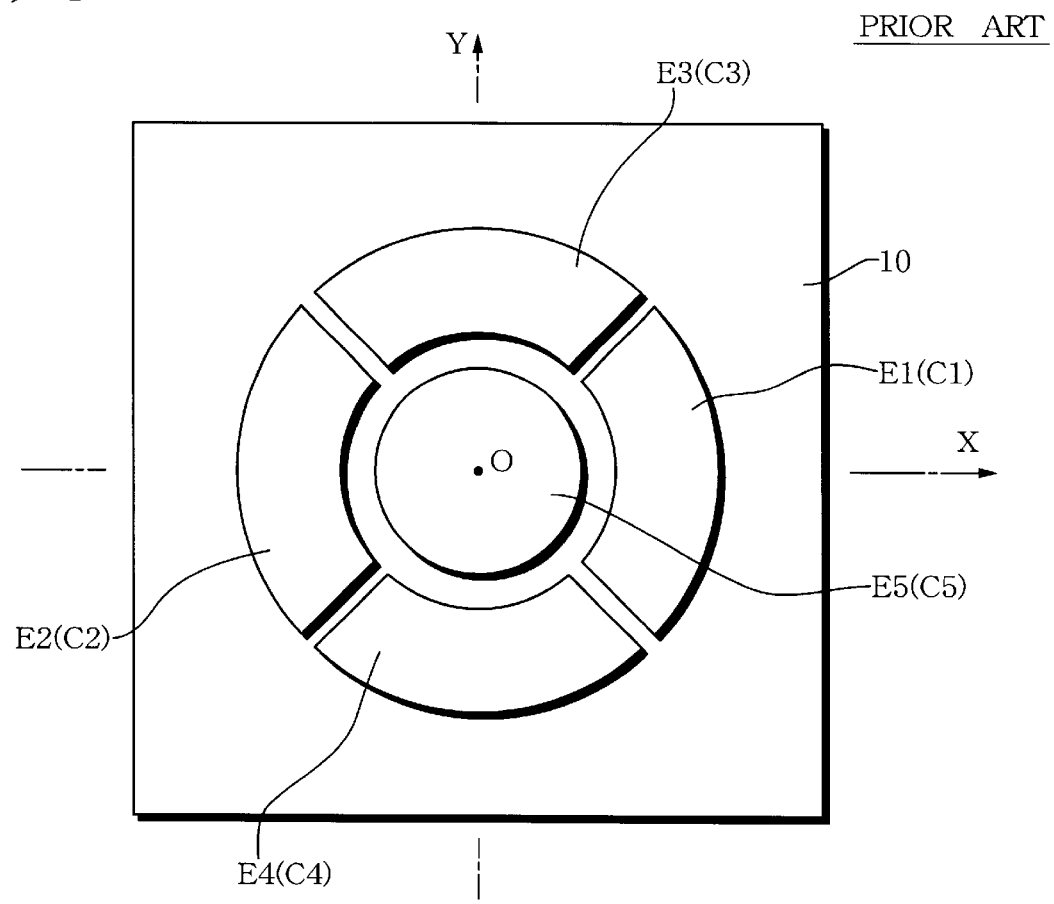
FIG. 2 is a top plan view of the base layer 10 of the capacitance sensor shown in FIG. 1 where

FIG. 2 is a top view of the base layer 10 shown in FIG. 1. As shown in the figure, there are five bottom electrodes E1 to E5 on the top of the base layer 10. It should be noted here that for the convenience of the following description an origin O of an XYZ three-dimensional coordinate system is defined at the top center point of the base layer 10, and the direction of the respective X, Y, and Z axes in this coordinate system are as indicated in FIGS. 1 and 2. Furthermore, the base layer 10 and the displacement layer 20 are arranged such that the top and bottom surfaces thereof are parallel to the XY plane. In addition, bottom electrodes E1 and E2 are in the positive and negative regions, respectively, of the X-axis, bottom electrodes E3 and E4 are in the positive and negative regions, respectively, of the Y-axis, and bottom electrode E5 surrounds the origin O.

Five top electrodes E6 to E10 are similarly disposed to the bottom of the displacement layer 20. It is to be noted that while a plan view of these top electrodes E6 to E10 is not shown, the planar arrangement of these top electrodes is identical to that of the bottom electrodes shown in FIG. 2. That is, top electrodes E6 to E10 are identical in shape to the corresponding bottom electrodes E1 to E5, and are disposed such that corresponding top and bottom electrodes are directly vertically opposed. Capacitance elements formed by the bottom electrodes E1 to E5 and the opposite top electrodes E6 to E10 are shown in the figures and referred to below as capacitance elements C1 to C5, and numbers C1 to C5 shown in parentheses after each of the bottom electrodes E1 to E5 in FIG. 2 indicate corresponding capacitance elements.

Operation of an acceleration sensor thus comprised is described in detail in the above-cited patents, and the underlying principle is therefore just briefly described below.

If acceleration acts on the weighted body 40 in the positive X-axis direction, that is, to the right in FIG. 1, a force causing displacement of the weighted body 40 in the positive X-axis direction results in deflection of the displacement layer 20. The gap between electrodes E1 and E6 thus decreases and the gap between electrodes E2 and E7 increases. This change in electrode gaps increases the capacitance of capacitance element C1, and decreases the capacitance of capacitance element C2. It is therefore possible to detect the direction and magnitude of acceleration acting in the X-axis direction by determining the difference between the capacitance values of capacitance elements C1 and C2. Note that the direction of acceleration is determined by the sign of the resulting difference, and the magnitude of acceleration by the absolute value of the difference. It is likewise possible to detect the direction and magnitude of acceleration in the Y-axis direction by determining the difference between the capacitance values of capacitance elements C3 and C4. The direction and magnitude of acceleration along the Z-axis can be detected by determining the capacitance of capacitance element C5.

Figure 3:
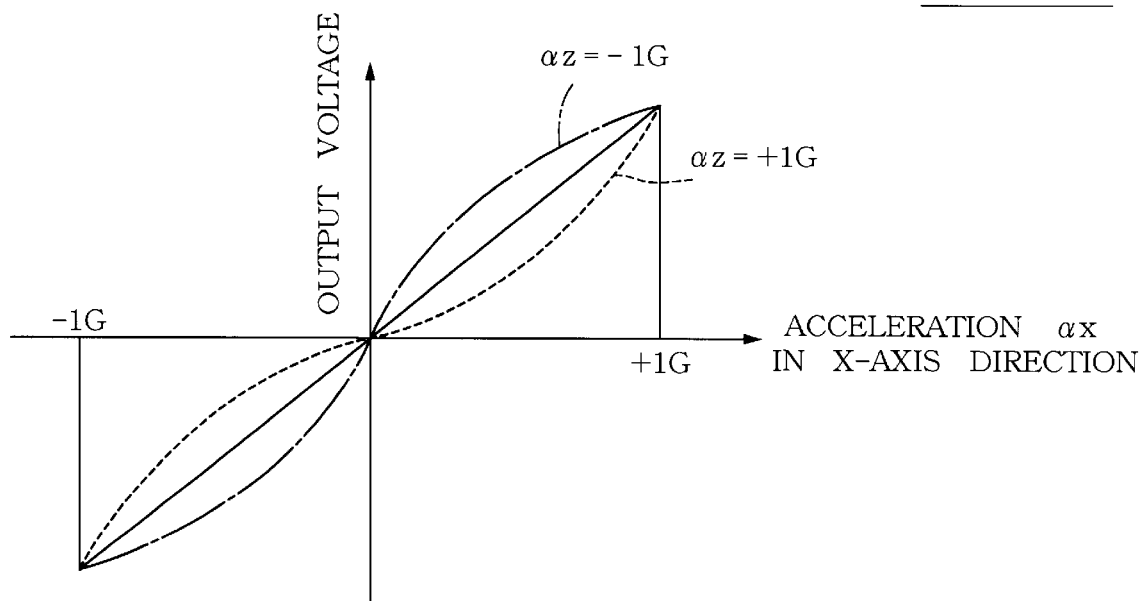
FIG. 3 is a graph of experimental results investigating the effect of other-axis interference in the capacitance sensor shown in FIG. 1.

In principle, this detection principle produces no interference between values detected along the X-axis and values detected along the Y-axis. That is, an acceleration component on the X-axis does not affect values detected along the Y-axis, and an acceleration component on the Y-axis does not affect values detected along the X-axis. However, an acceleration component on the Z-axis does affect, however slightly, values detected on the X-axis and values detected on the Y-axis. FIG. 3 is a graph of experimental results from an investigation of the effects of interference between a force on one axis and values detected on another axis (referred to below as "other-axis interference").

More specifically, the graph in FIG. 3 shows the results of measuring acceleration αx in the X-axis direction in various operating environments using the above-described acceleration sensor. The actual acceleration αx applied in these tests is shown on the X-axis in FIG. 3, and the detected output voltage is shown on the Y-axis. Note that this output voltage corresponds to the difference between the capacitance of capacitance elements C1 and C2 at a given acceleration.

The solid line in FIG. 3 shows results obtained with acceleration αx applied only in the X-axis direction. Note that there is a direct linear correlation between the output voltage and the applied acceleration αx (in the range −1G $<\alpha x <+1G$), indicating that acceleration $\alpha x$ is accurately detected. The dotted line shows the results of measuring X-axis acceleration $\alpha x$ when a +1G acceleration $\alpha z$ is applied constantly along the Z-axis (that is, upward acceleration is acting constantly on weighted body 40 in FIG. 1). Note that there is no longer a direct linear relationship between the output voltage and the acceleration $\alpha x$ with the curve indicating the detection error. The dot-dash line shows the results of measuring X-axis acceleration $\alpha x$ when a −1G acceleration $\alpha z$ is applied constantly along the Z-axis (that is, downward acceleration is acting constantly on weighted body 40 in FIG. 1). Note that again there is no longer a direct linear relationship between the output voltage and the acceleration $\alpha x$ with the curve indicating the detection error.

Figure 4:
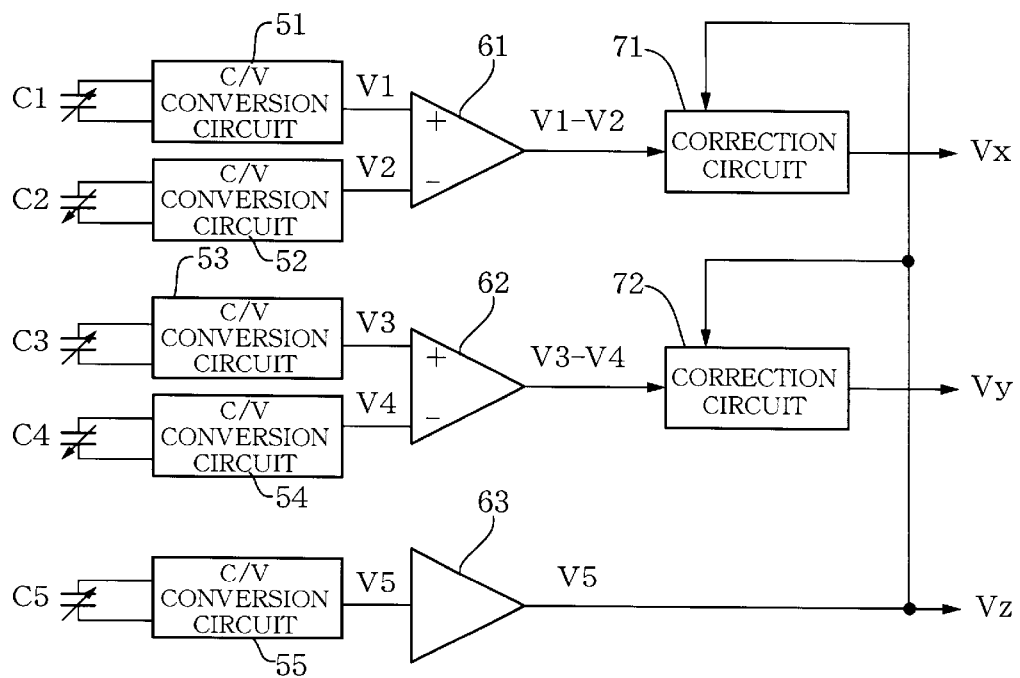
FIG. 4 is a circuit diagram of an exemplary detection circuit comprising a function for compensating measurement error in the capacitance sensor shown in FIG. 1.

FIG. 4 is a circuit diagram of an exemplary detection circuit comprising a measurement error correction function. References C1 to C5 on the left side of FIG. 4 are the capacitance elements C1 to C5 in the above acceleration sensor, and C/V conversion circuits 51 to 55 convert the capacitance C1 to C5 of the corresponding capacitance elements to voltage values V1 to V5. Subtracter 61 calculates the difference between voltages V1 and V2. This difference is then corrected by correction circuit 71, and the resulting voltage Vx is output as the detected value for acceleration $\alpha x$ in the X-axis direction. The difference between voltages V3 and V4 is likewise calculated by subtracter 62, corrected by correction circuit 72, and the resulting voltage Vy is output as the detected value for acceleration $\alpha y$ in the Y-axis direction. Voltage V5 is passed through buffer 63 and output directly as the detected voltage Vz for acceleration $\alpha z$ in the Z-axis direction.

It is to be noted that correction circuit 71 and correction circuit 72 have a function for correcting voltage differences (V1–V2) and (V3–V4), respectively, based on voltage V5. These differences are thus corrected to obtain correct detection values for X-axis acceleration $\alpha x$ and Y-axis acceleration $\alpha y$ even where an acceleration $\alpha z$ is present on the Z-axis.

By thus providing a correction circuit and applying a correction process such as described above it is therefore possible to obtain final detection values that are correct and not affected by other-axis interference. However, a correction process obtaining a linear output for nonlinear measurement values such as shown in FIG. 3 requires a very complicated correction circuit, thus increasing the overall complexity of the sensor and unavoidably increasing cost.

<2>A Capacitance Sensor According to the Present Invention

The basic structure and operation of a capacitance sensor according to the present invention is described next below. The basic components of said sensor are three substrates: a bottom fixed layer, a top fixed layer, and a displacement layer. The structure of each of these layers is first described below in sequence.

Figure 5:
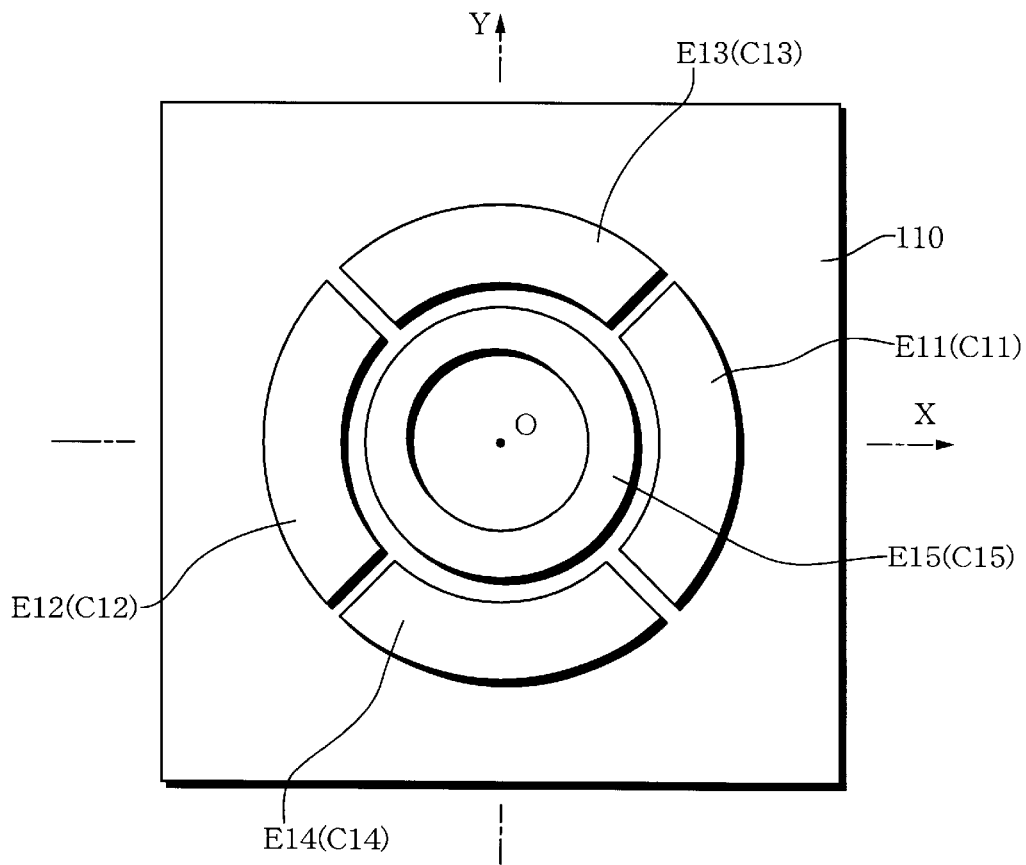
FIG. 5 is a top plan view of a bottom fixed layer 110 used in a capacitance sensor according to the present invention.
Figure 6:
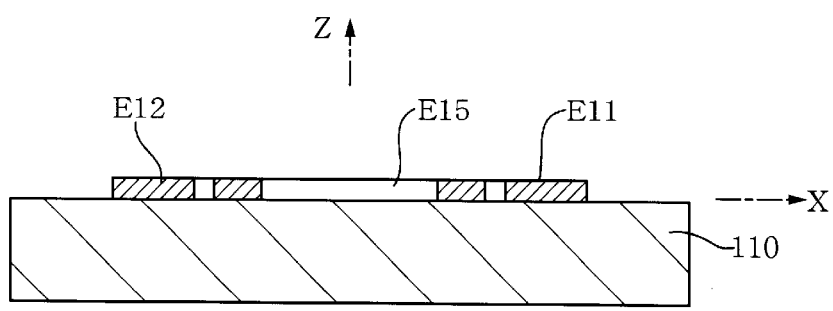
FIG. 6 is a side section view through the X-axis of the bottom fixed layer 110 shown in FIG. 5.

FIG. 5 is a top view of the bottom fixed layer 110, and FIG. 6 is a side section view of the same. It should be noted here that for the convenience of the following description, an origin O of an XYZ three-dimensional coordinate system is defined at the top center point of the bottom fixed layer 110, and the direction of the respective X, Y, and Z axes in this coordinate system are as indicated in the figures.

The bottom fixed layer 110 is a square dielectric substrate of which the top and bottom surfaces are parallel to the XY plane with the Z axis passing through the center. Note, further, that the bottom fixed layer 110 is sufficiently rigid overall. As shown in FIG. 5, there are five electrodes E11 to E15 on the top of the bottom fixed layer 110. These electrodes are below referred to as the bottom electrodes because they are formed on the bottom fixed layer 110.

Figure 7:
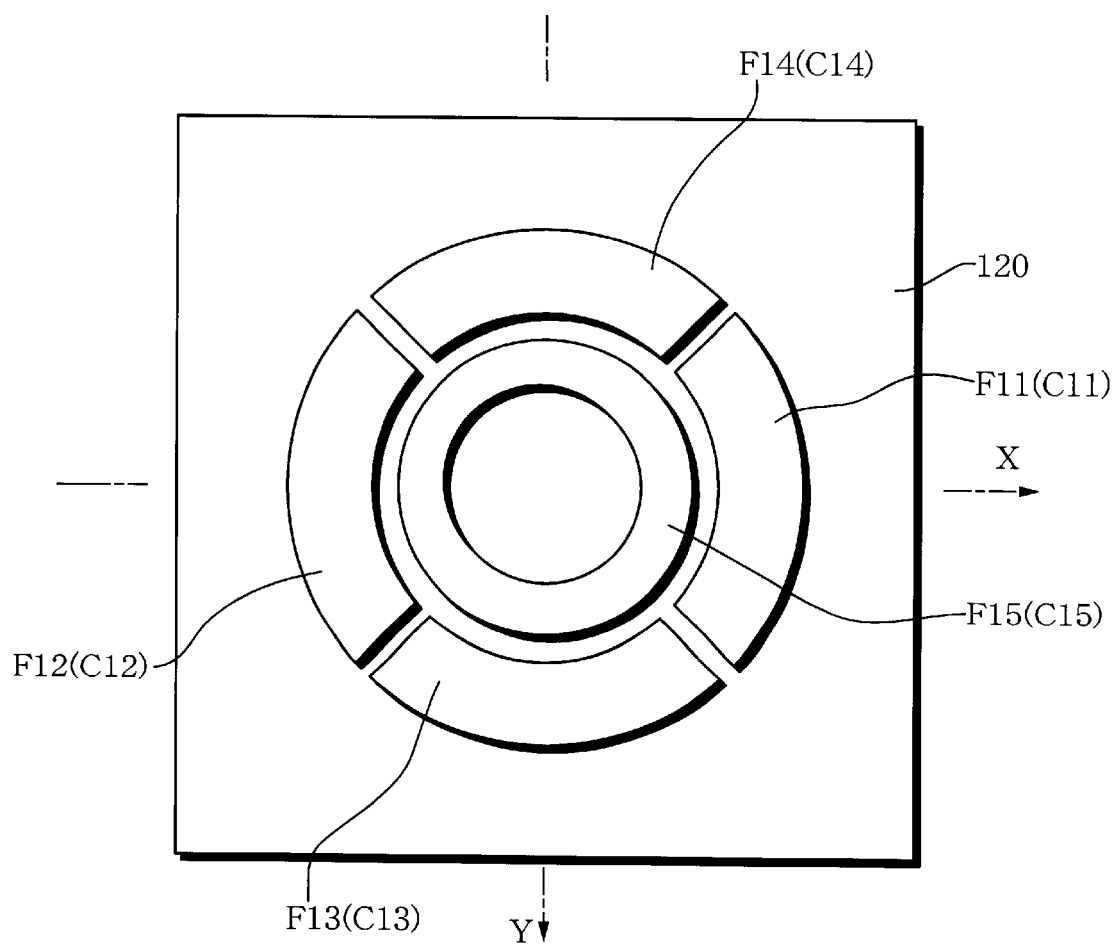
FIG. 7 is a bottom view of a displacement layer 120 used in a capacitance sensor according to the present invention.
Figure 8:
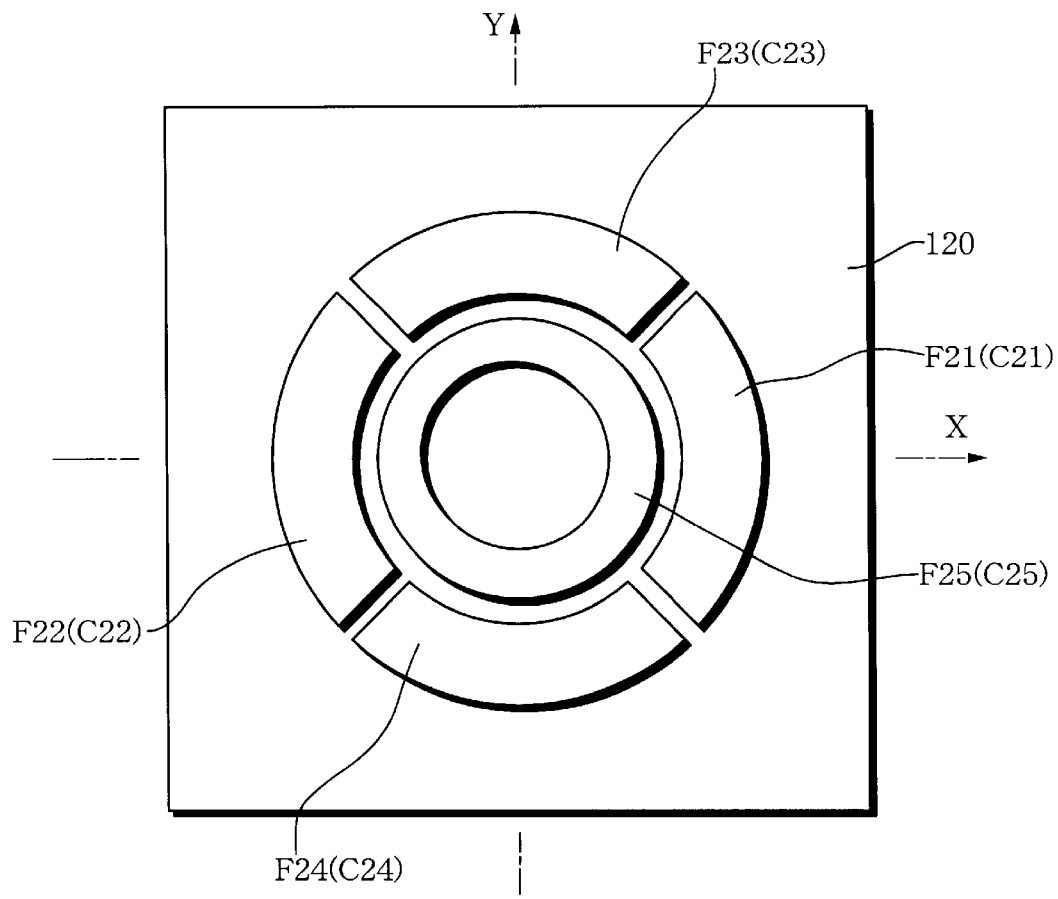
FIG. 8 is a top plan view of the displacement layer 120 shown in FIG. 7.
Figure 9:
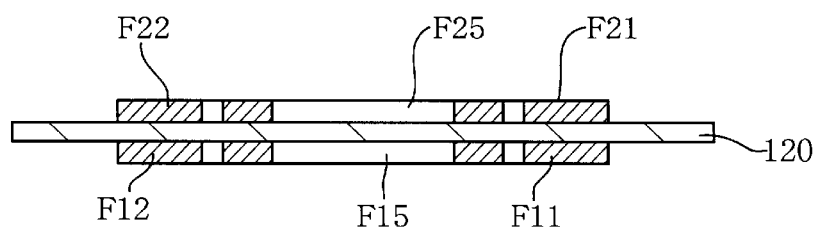
FIG. 9 is a side section view through the X-axis of the displacement layer 120 shown in FIG. 7 and FIG. 8.

FIG. 7 is a bottom view, FIG. 8 a top view, and FIG. 9 a side section view of the displacement layer 120. As described more fully below, this displacement layer 120 is positioned above the bottom fixed layer 110. The top and bottom surfaces thereof are thus also obviously parallel to the same XY plane with the X and Y axes oriented as shown in the figures. Like the bottom fixed layer 110, this displacement layer 120 is also a square dielectric substrate, but is also relatively thin and somewhat flexible. A force or acceleration applied thereto can thus cause the displacement layer 120 to deflect.

As shown in FIG. 7, five electrodes F11 to F15 are on the bottom of the displacement layer 120, and as shown in FIG. 8 five electrodes F21 to F25 are on the top. These electrodes are below referred to as displacement electrodes because they are displaced with deflection of the displacement layer 120.

Figure 10:
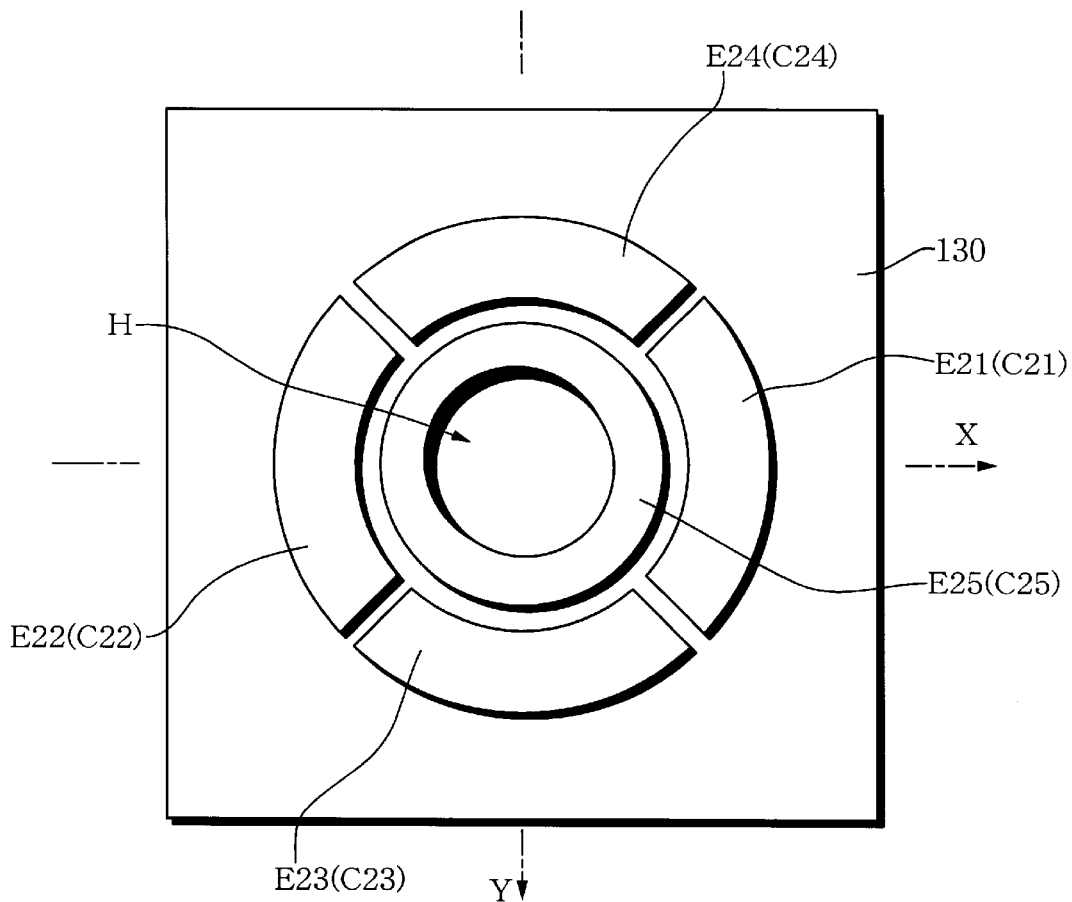
FIG. 10 is a bottom view of the top fixed layer 130 used in a capacitance sensor according to the present invention.
Figure 11:
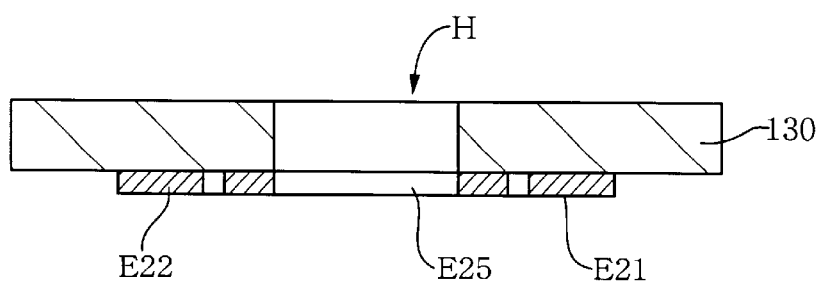
FIG. 11 is a side section view through the X-axis of the top fixed layer 130 shown in FIG. 10.

FIG. 10 is a bottom view, and FIG. 11 is a side section view, of the top fixed layer 130. As also described more fully below, this top fixed layer 130 is positioned above the bottom fixed layer 110. The top and bottom surfaces thereof are thus also obviously parallel to the same XY plane with the X and Y axes oriented as shown in the figures. Note, further, that the top fixed layer 130 is sufficiently rigid overall. As shown in FIG. 10, there are five electrodes E21 to E25 on the bottom of the top fixed layer 130. These electrodes are below referred to as the top electrodes because they are formed on the top fixed layer 130. It is to be further noted that a through-hole H is also formed in the middle of the top fixed layer 130 in an inside part of the washer-shaped top electrode E25.

Figure 12:
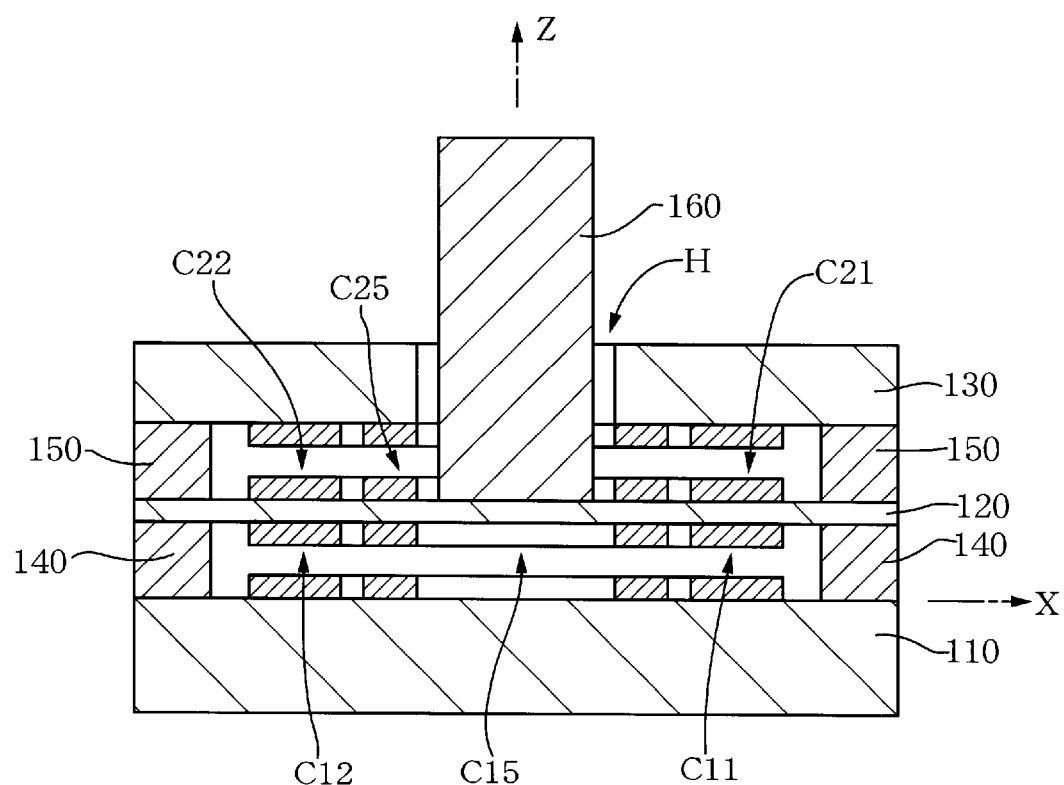
FIG. 12 is an overall side section view of a capacitance sensor according to a fundamental embodiment of the present invention.

FIG. 12 is a side section view showing the above three substrates 110, 120, and 130 fixed together through intervening pedestals 140 and 150 in a stacked configuration, thus forming the main part of a capacitance sensor according to the present invention.

Pedestal 140 is a wall structure surrounding the top surface of the bottom fixed layer 110 and functioning as a spacer for connecting bottom fixed layer 110 with displacement layer 120 with a specific gap therebetween. Pedestal 150 is likewise a wall structure surrounding the bottom of the top fixed layer 130 and functioning as a spacer for connecting top fixed layer 130 with displacement layer 120 with a specific gap therebetween.

A columnar working body 160 is further connected to the top center of the displacement layer 120. Note that this working body 160 is inserted through through-hole H in top fixed layer 130 and has mass sufficient to function as a weight for detecting acceleration. It is to be noted that when the present invention is applied to an acceleration sensor this working body 160 functions as a weighted body. However, because as described more fully below the present invention shall not be limited to application in an acceleration sensor, it is referred to herein as a working body.

In this preferred embodiment of the invention each of the layers 110, 120, and 130 and pedestals 140 and 150 is made from a dielectric material. More specifically, exemplary layers and pedestals are made from a glass epoxy substrate or ceramic substrate, though obviously not limited thereto. Because the displacement layer 120 must be flexible, its thickness must be controlled to obtain the desired flexibility when a glass epoxy substrate or similar material is used. It should be further noted that the greater the flexibility of this displacement layer 120, the more sensitive the sensor. On the other hand, it is necessary to assure sufficient rigidity in the bottom fixed layer 110 and top fixed layer 130 and the pedestals 140 and 150 because these parts function as stationary members in which no displacement occurs during measurement. The actual dimensions of the various parts can be desirably determined according to the materials used and the sensitivity required in the sensor. It should be further noted that the dimensional ratio between the individual parts shown in the figures is for convenience of illustration in the figures only, and not specifically indicative of the actual dimensional ratio of an actual sensor according to the present invention.

When acceleration acts on the working body 160, a force resulting from this acceleration is transmitted to the center of the displacement layer 120, thus causing the displacement layer 120 to displace. This displacement can be detected as a change in the capacitance of the capacitance elements formed by the various electrodes to detect acceleration as described in section 1 above under the description of an acceleration sensor according to the related art.

As shown in FIG. 12, an open space of a specific width is assured between the outside circumference surface of the working body 160 and the inside circumference surface of the through-hole H to allow the working body 160 to displace with a certain degree of freedom. It is to be noted that while the sensor according to this preferred embodiment of the present invention is described with reference to an acceleration sensor, it will be obvious to one with ordinary skill in the related art that this exemplary sensor can function as a force sensor with various applications.

For example, pressing directly on the working body 160 with the finger creates a displacement in the displacement layer 120 in the same way that acceleration does. It is therefore possible to detect an applied external force using the same principle used to detect acceleration. Furthermore, if the working body 160 is made from a magnetic material the displacement layer 120 can be made to displace by applying a magnetic force. In this case, therefore, the sensor can be used as a magnetic sensor.

It will thus be apparent that a sensor according to the present invention can be used as a sensing device for detecting any physical quantity, such as acceleration and magnetism, that can be used to apply force to the working body 160.

The operation of a sensor according to this preferred embodiment of the invention is described next with particular attention to the structure of the electrodes formed in the various parts. As shown in FIG. 5, there are five bottom electrodes E11 to E15 formed on the top of the bottom fixed layer 110. Of these bottom electrodes E11 and E12 are in the positive and negative regions, respectively, of the X-axis, bottom electrodes E13 and E14 are in the positive and negative regions, respectively, of the Y-axis, and bottom electrode E15 surrounds origin O.

As shown in FIG. 7, five displacement electrodes F11 to F15 are similarly disposed to the bottom of the displacement layer 120 facing the top of the bottom fixed layer 110. It is to be noted that the shape and size of these displacement electrodes F11 to F15 are identical to the shape and size of the bottom electrodes E11 to E15, and the displacement electrodes F11 to F15 are disposed opposite corresponding bottom electrodes E11 to E15 In other words, the planar shape and pattern of the bottom electrodes E11 to E15 is identical to the planar shape and pattern of the displacement electrodes F11 to F15. The resulting five electrode pairs each form a capacitance element C11 to C15, and numbers C11 to C15 shown in parentheses after each of the bottom electrodes E11 to E15 in FIG. 5 and displacement electrodes F11 to F15 in FIG. 7 indicate corresponding capacitance elements.

There are also five top electrodes E21 to E25 formed on the bottom of top fixed layer 130 as shown in FIG. 10. Of these top electrodes E21 and E22 are in the positive and negative regions, respectively, of the X-axis. (More accurately speaking, positioned in the positive and negative regions of the X-axis projection on the substrate obtained by projecting the X-axis in the direction of the Z-axis. The same holds for the positive and negative Y-axis regions below). Top electrodes E23 and E24 are thus in the positive and negative regions, respectively, of the Y-axis, and top electrode E25 surrounds origin O.

As shown in FIG. 8, five displacement electrodes F21 to F25 are similarly disposed to the top of the displacement layer 120 facing the bottom of top fixed layer 130. It is to be noted that the shape and size of these displacement electrodes F21 to F25 are identical to the shape and size of the top electrodes E21 to E25, and the displacement electrodes F21 to F25 are disposed opposite corresponding top electrodes E21 to E25. In other words, the planar shape and pattern of the top electrodes E21 to E25 is identical to the planar shape and pattern of the displacement electrodes F21 to F25, displacement electrodes F11 to F15, and bottom electrodes E11 to E15. The resulting five electrode pairs each form a capacitance element C21 to C25, and numbers C21 to C25 shown in parentheses after each of the electrodes F21 to F25 in FIG. 8 and electrodes E21 to E25 in FIG. 10 indicate corresponding capacitance elements.

With this configuration there are five capacitance elements C11 to C15 formed between the bottom fixed layer 110 and displacement layer 120, and five capacitance elements C21 to C25 formed between top fixed layer 130 and displacement layer 120. That it is therefore possible to use four capacitance elements C11, C12, C21, and C22 disposed along the X-axis to detect acceleration $\alpha x$ in the X-axis direction, four capacitance elements C13, C14, C23, and C24 disposed along the Y-axis to detect acceleration $\alpha y$ in the Y-axis direction, and two capacitance elements C15 and C25 disposed near the origin O to detect acceleration $\alpha z$ in the Z-axis direction will be understood considering the operation of a capacitance sensor according to the related art as described above in section 1.

When the acceleration that is to be detected by the capacitance sensor is not applied to the sensor shown in FIG. 12, the displacement layer 120 maintains a reference state parallel to the XY plane as shown in the figure and the electrode gap between opposing electrodes is the same in each electrode pair. However, when acceleration is applied to the working body 160 along the X-axis in the positive direction, the displacement layer 120 deflects. The resulting displacement decreases the electrode gap in capacitance elements C11 and C22 and thus increases their capacitance, and increases the electrode gap in capacitance elements C12 and C21 and thus decreases their capacitance. The difference between the sum of the capacitance of capacitance elements C11 and C22, and the sum of the capacitance of capacitance elements C12 and C21, is then obtained as indicative of acceleration $\alpha x$ in the X-axis direction. In this case, too, the sign of the difference indicates the direction of acceleration, and the absolute value of the difference indicates the amount of acceleration.

Acceleration $\alpha y$ in the Y-axis direction can be similarly determined by obtaining the difference between the total capacitance of elements C13 and C24, and the total capacitance of elements C14 and C23.

Acceleration $\alpha z$ in the Z-axis direction can be obtained from the difference between the capacitance of element C25 and the capacitance of element C15.

Figure 13:
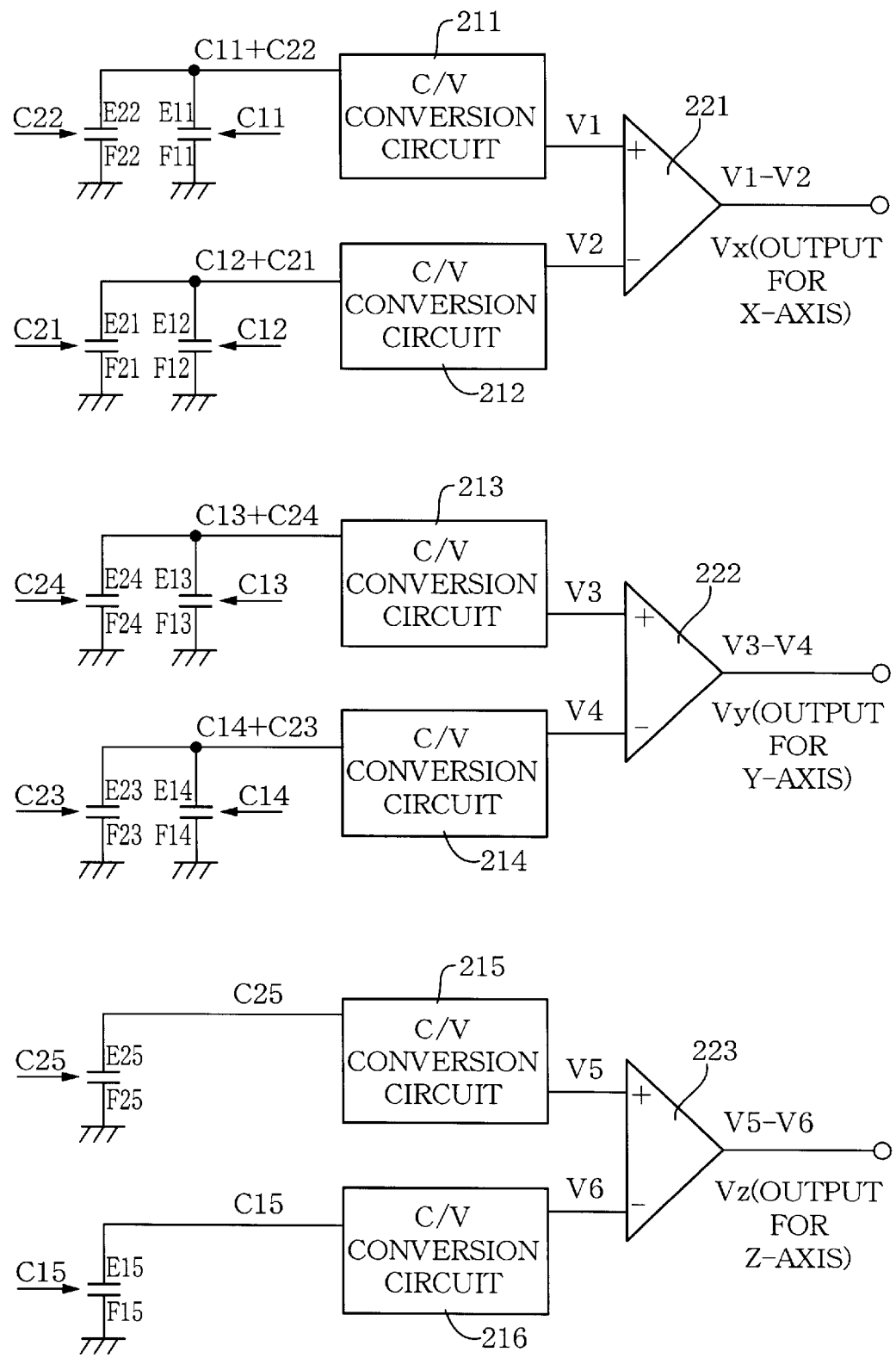
FIG. 13 is a circuit diagram of an exemplary detection circuit used in the capacitance sensor shown in FIG. 12.

A detection circuit as shown in the circuit diagram of FIG. 13 can be used to obtain acceleration components αx, αy, and αz along the corresponding axes of an XYZ three-dimensional coordinate system. References C11 to C15 and C21 to C25 on the left side of FIG. 13 represent the corresponding capacitance elements in the acceleration sensor shown in FIG. 12, and E11 to E15, F11 to F15, E21 to E25, and F21 to F25 are the electrodes forming the various capacitance elements. It is to be noted that electrodes F11 to F15 and F21 to F25 are all grounded in this exemplary embodiment. In other words, the displacement electrodes on the displacement layer 120 are all grounded. By thus grounding the displacement electrode side of the electrode pairs, a plurality of displacement electrodes can be physically disposed using a single common electrode, and the construction of the displacement layer 120 can thus be simplified. In other words, while the individual displacement electrodes on the displacement layer 120 shown in FIG. 7 and FIG. 8 are discrete, electrically isolated electrodes, they can era be replaced with a single common electrode such as a large disk-shaped electrode.

Returning to FIG. 13 it will be noted that capacitance elements C11 and C22, C12 and C21, C13 and C24, and C14 and C23 are parallel connected to obtain the sum of the capacitance in the two elements. The resulting capacitance sums are then converted by C/V conversion circuits 211 to 214 to voltages V1 to V4. Subtracter 221 calculates the difference V1–V2 to obtain and output voltage Vx indicative of the detected acceleration ax in the X-axis direction. Subtracter 222 likewise calculates the difference V3–V4 to obtain and output voltage Vy indicative of the detected acceleration αy in the Y-axis direction. The capacitance of capacitance element C25 is converted by C/V conversion circuit 215 to voltage V5, and the capacitance of capacitance element C15 is converted by C/V conversion circuit 216 to voltage V6. Subtracter 223 calculates the difference V5–V6 to obtain and output voltage Vz indicative of the detected acceleration αz in the Z-axis direction.

The detected acceleration values thus obtained for each axis are accurate detection values free of other-axis interference. It will be remembered that the lack of interference between the X-axis and Y-axis components is the same as in the capacitance sensor described in section 1 according to the related art. This is because the electrodes contributing to detecting the X-axis component, that is, electrodes E11, E12, F11, F12, E21, E22, F21, F22 on the X-axis, are symmetrical to the XZ plane, and the electrodes contributing to detecting the Y-axis component, that is, electrodes E13, E14, F13, F14, E23, E24, F23, F24 on the Y-axis, are symmetrical to the YZ plane. For example, the bottom electrodes E11 and E12 in FIG. 5 and the displacement electrodes F11 and F12 in FIG. 7 are symmetrical to the XZ plane. As a result, when acceleration along the Y-axis displaces the displacement layer 120, the increasing and decreasing parts of the electrode gap in capacitance elements C11 and C12 are balanced, and there is thus no change in the overall capacitance of the capacitance elements. In other words, acceleration in the Y-axis direction does not produce a change in the capacitance of capacitance elements arrayed along the X-axis, and the detection voltage Vx shown in FIG. 13 is not affected by the Y-axis acceleration component. For the same reason, acceleration in the X-axis direction does not cause any change in the capacitance of the capacitance elements along the Y-axis, and the detection voltage Vy shown in FIG. 13 is not affected by the X-axis acceleration component.

Let us next consider the effect of an acceleration component in the Z-axis direction on detection voltages Vx and Vy.

As noted above and shown by the dotted and dot-dash lines in the graph of FIG. 3, the presence of an acceleration component αz in the Z-axis direction affects the output voltage detected for the X-axis in a conventional capacitance sensor as described in section 1.

In the case of a capacitance sensor according to the present invention, however, the output voltage for acceleration αx along the X-axis is linear as indicated by the solid line in FIG. 3 irrespective of any acceleration component αz on the Z-axis. This is because detection is based on the combined capacitance of capacitance elements below the displacement layer 120 and capacitance elements above the displacement layer 120.

For example detecting the X-axis acceleration component is based on the difference of the sum of the capacitance of elements C11 and C22, and the sum of the capacitance of elements C12 and C21 in the device shown in FIG. 12. This is because while the increase or decrease in the capacitance of elements C11 and C22 is the same, and the increase or decrease in the capacitance of elements C12 and C21 is the same, for displacement resulting from acceleration along the X-axis, the increase or decrease in the capacitance of elements C11 and C22 is the opposite of the increase or decrease in the capacitance of elements C12 and C21.

On the other hand, for displacement resulting from acceleration on the Z-axis, the increase or decrease in the capacitance of element C11 is opposite the increase or decrease in the capacitance of element C22, the increase or decrease in the capacitance of elements C12 and C21 are likewise mutually opposite, and the increase/decrease change can be cancelled by obtaining the sums. Information relating to an acceleration component in the X-axis direction is therefore included in detection voltage Vx, but information relating to a Z-axis acceleration component is not contained. Information relating to an acceleration component in the Y-axis direction is for the same reason included in detection voltage Vy, but information relating to a Z-axis acceleration component is not contained in voltage Vy.

The physical configuration, that is, the shape, size, and electrode gap, of mutually cancelling capacitance elements is preferably precisely identical in order to accurately cancel any increase/decrease change resulting from an acceleration component on the Z-axis. In the exemplary embodiment described above, for example, if capacitance elements C11 and C22 are capacitance elements with a completely identical physical configuration, and capacitance elements C12 and C21 are capacitance elements with a completely identical physical configuration, the above-noted cancellation will be accurately accomplished. It will also be obvious that accurate cancellation of this increase/decrease change can be accomplished even if the physical configurations differ by setting the electrode shape, size, gap, and other characteristics within specific parameters, but in practice using an identical physical configuration is easiest. Furthermore, it is also convenient in practice for X-axis sensitivity and Y-axis sensitivity to be the same. It is therefore preferable for electrodes E11 to E14, electrodes F11 to F14, electrodes E21 to E24, and electrodes F21 to F24, that is, all electrodes used for detection on the X and Y axes, to have the same shape and same size, be symmetrically arranged to the origin O, and have the same electrode gap in each capacitance element when in the reference state with no acceleration at work.

Finally, let us consider the effect of an acceleration component on the X-axis or Y-axis on detection voltage Vz. It will be remembered that in a sensor according to this preferred embodiment as described above the electrodes E15, F15, E25, and F25 used for detecting an acceleration component in the Z-axis direction are all washer-shaped circular electrodes rotationally symmetrical to the Z-axis. As a result, any change in the electrode gap increase or decrease resulting from displacement of the displacement layer 120 due to an acceleration component in the X-axis or Y-axis direction is canceled. This displacement therefore has no effect on the capacitance of a capacitance element formed by a rotationally symmetrical electrode pair. Information relating to an acceleration component in the X-axis or Y-axis direction is therefore not contained in detection voltage Vz.

It should also be noted that in order to achieve a linear output for acceleration components in the Z-axis direction the physical configuration of capacitance element C15 is preferably identical to the physical configuration of capacitance element C25. Even more specifically, electrodes E15, F15, E25, and F25, that is, all electrodes used for detection on the Z-axis direction, preferably have the same shape and same size, and have the same electrode gap in capacitance elements C15 and C25 when in the reference state with no acceleration at work.

The merits of a capacitance sensor according to the present invention as described above are several as shown below.

(1) Values detected for acceleration in the X-axis or Y-axis direction are not affected by acceleration in the Z-axis direction, and an accurate detection value free of other-axis interference can be achieved.

(2) Detection sensitivity is twice that achieved with a conventional sensor as described in section 1 because detection is possible using both a bottom capacitance element and a top capacitance element.

(3) Linearity and temperature characteristics are also improved because differential detection is also used to detect acceleration in the Z-axis direction.

(4) The bottom fixed layer 110 and top fixed layer 130 function as stopping layers limiting displacement of the displacement layer 120 to within a specific range. As a result, displacement of the displacement layer 120 is limited to within this specific range even when great acceleration or force is applied to the working body 160, and the displacement layer 120 can thus be protected from mechanical damage.

(5) The displacement layer 120 is housed within a room formed by the bottom fixed layer 110, top fixed layer 130, and pedestals 140 and 150. Resonance is restricted by the damping effect of air inside this room, and problems arising from vibration are therefore inhibited.

<3>A More Practical Embodiment

The basic structure and operation of a capacitance sensor according to the present invention was described in section 2 above with reference to the basic configuration shown in FIG. 12. A more practical embodiment of a capacitance sensor according to the present invention is described next below.

Figure 14:
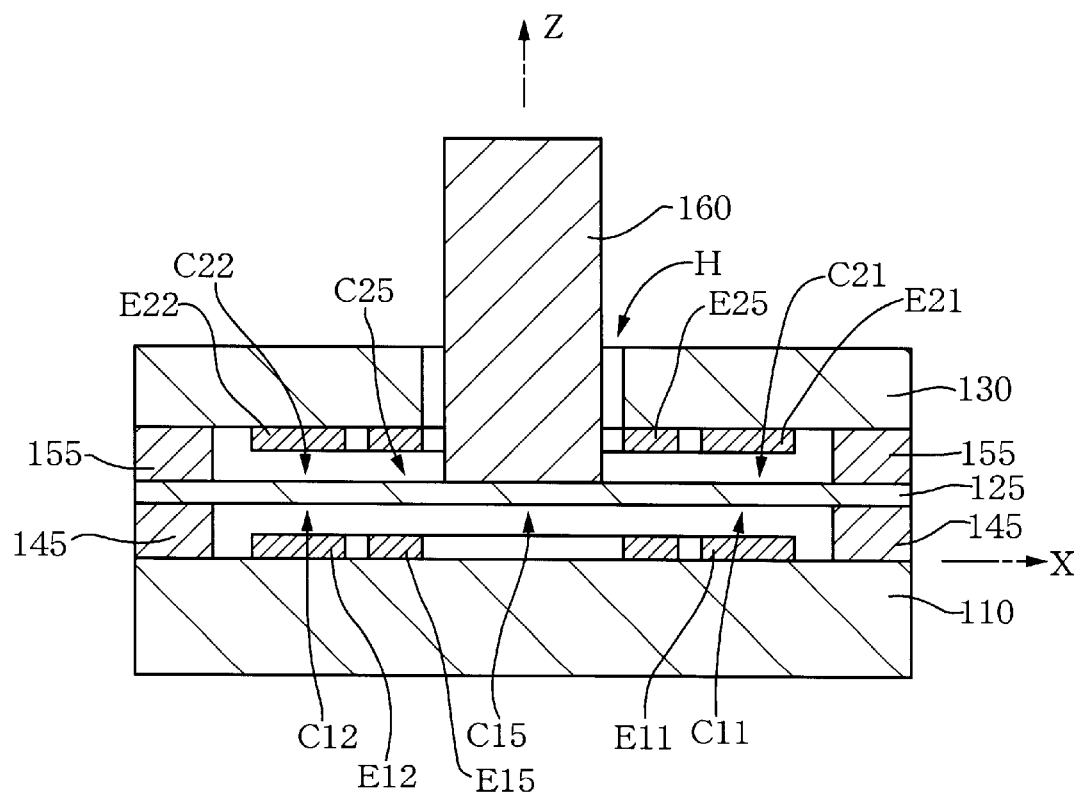
FIG. 14 is a side section view of a more simplified version of the capacitance sensor shown in FIG. 12.

The embodiment shown in side section view in FIG. 14 is a simplification of the embodiment shown in FIG. 12. As noted above, the sensor shown in FIG. 12 has displacement electrodes formed on both top and bottom surfaces of a dielectric displacement layer 120 to form capacitance elements. As shown in the circuit diagram in FIG. 13, however, all of the displacement electrodes on the displacement layer 120 can be held at a common potential (the ground potential in the example shown in FIG. 13) for signal processing purposes, and these displacement electrodes can therefore be physically comprised with a single common electrode. This is accomplished in the sensor shown in FIG. 14 by using a flexible, conductive substrate (such as a stainless steel film or a silicon substrate doped with a high concentration of impurity) for the displacement layer 125, and using the displacement layer 125 itself as the single common electrode. In other words, the displacement layer 125 shown in the sensor in FIG. 14 functions both as the displacement layer 120 and as the displacement electrodes F11 to F15 and F21 to F25 of the sensor shown in FIG. 12.

Pedestal 145 in FIG. 14 is a spacer for fixing bottom fixed layer 110 to displacement layer 125 with a specific gap therebetween, and pedestal 155 is a spacer for fixing displacement layer 125 to top fixed layer 130 with a specific gap therebetween. As noted above, the displacement layer 125 is a flexible conductive substrate the perimeter area of which is fixed to bottom fixed layer 110 and top fixed layer 130 by way of intervening pedestals 145 and 155. A working body 160 is additionally connected at the center part of the displacement layer 125. As a result, the intermediate part between the perimeter and center areas of displacement layer 125 functions as the flexible part that deflects and is thus displaced in response to an applied force. Because the displacement layer 125 itself functions as the displacement electrode, the capacitance change in the capacitance elements described in the second section above still occurs.

Wiring to the ground as shown in the circuit diagram in FIG. 13 can be completely achieved using a flexible, conductive substrate as the displacement layer 125 by simply grounding the displacement layer 125 at one point. Capacitance element pairs C11 and C22, C12 and C21, C13 and C24, and C14 and C23 in FIG. 13 are also capacitance element pairs for which it is necessary to obtain the sum of the capacitance values. It is therefore necessary for these capacitance element pairs to electrically connect the electrodes that are not common electrodes (the grounded electrode on the displacement layer 125), and connect these nodes to the input terminals of the C/V conversion circuits 211 to 214. A simplified, desirable structure can be achieved by forming a through-hole in the bottom fixed layer 110 and top fixed layer 130 at the locations of the electrodes to be connected, and then electrically connecting the electrode pairs to be connected using a wiring layer by way of these through-holes.

Figure 15:
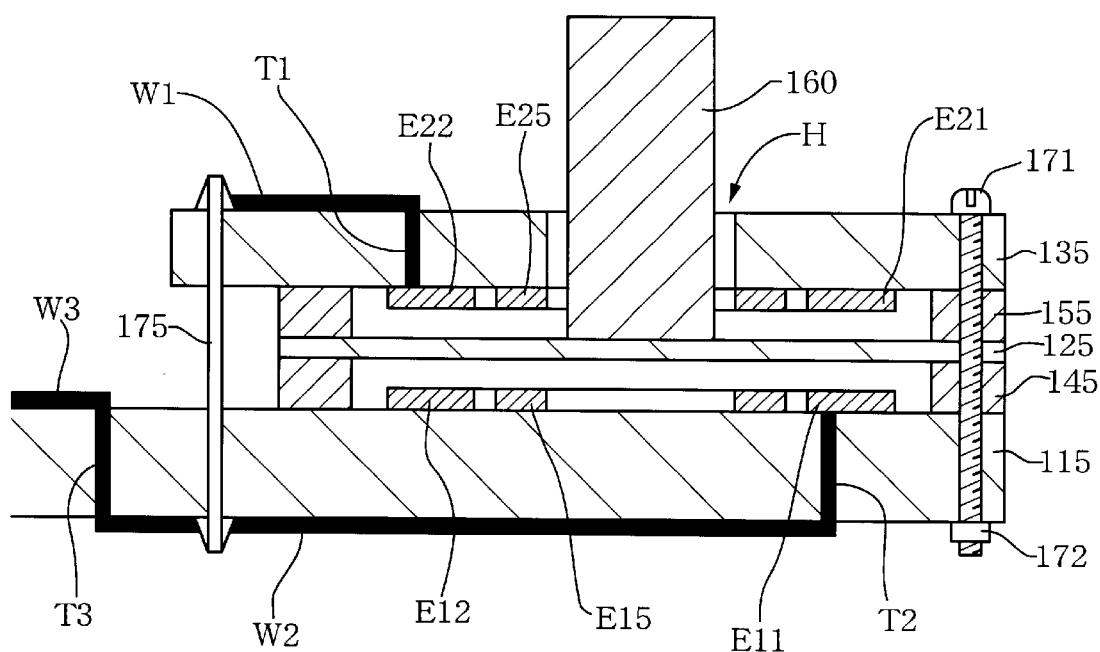
FIG. 15 is a side section view of exemplary interconnects between electrodes for use with the sensor shown in FIG. 14.

FIG. 15 is a side section view showing a typical interconnect between electrode E11 and electrode E22. The sensor shown in FIG. 15 is substantially the same as that in FIG. 14. It differs in that the bottom fixed layer 115 used in place of bottom fixed layer 110 and the top fixed layer 135 used in place of top fixed layer 130 both extend slightly to the left as seen in the figure. In addition, the layers and pedestals are firmly secured by a bolt 171 and nut 172.

A through-hole is formed at the location of electrode E22 in the top fixed layer 135, and a conductive path T1 is provided in the through-hole. This through-hole conductive path T1 is further connected to wiring layer W1. A through-hole is likewise formed at the location of electrode E11 in the bottom fixed layer 115, and a conductive path T2 is provided in the through-hole. This conductive path T2 is further connected to wiring layer W2. Conductivity between wiring layer W1 and wiring layer W2 is provided by interconnect lead pin 175. Wiring layer W2 is further connected through a through-hole conductive path T3 to wiring layer W3. This can then be connected to the input terminal to C/V conversion circuit 211 to complete the wiring for electrodes E11 and E22 in the circuit diagram shown in FIG. 13.

Figure 16:
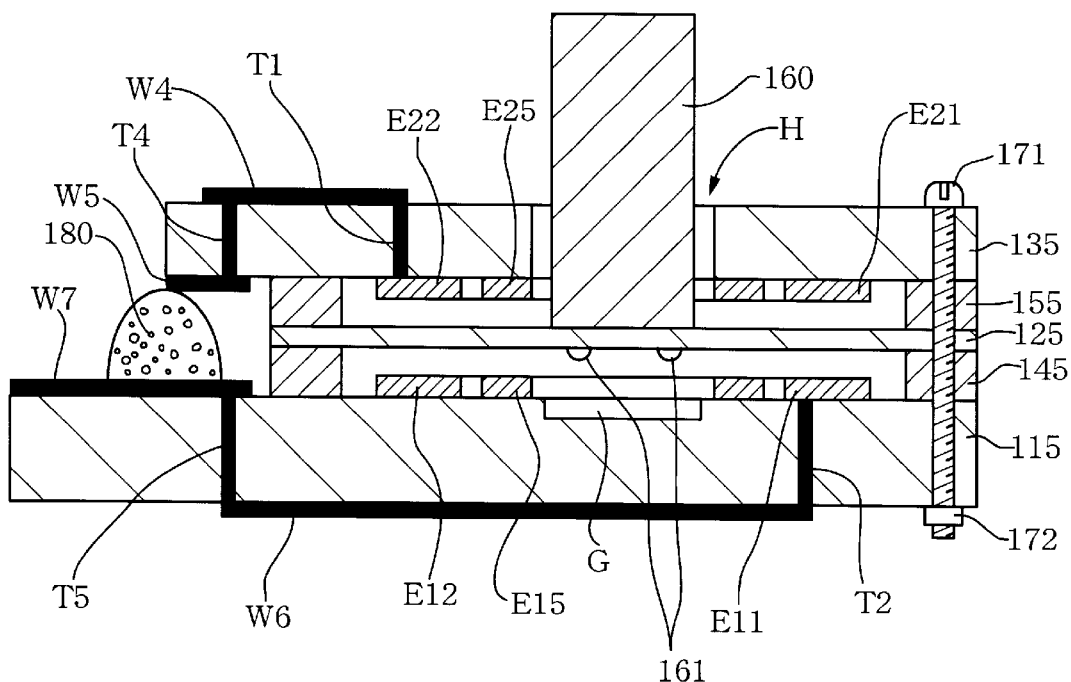
FIG. 16 is a side section view of further exemplary interconnects between electrodes for use with the sensor shown in FIG. 14.

FIG. 16 is a side section view of an alternative version of the wiring shown in FIG. 15. In this case a through-hole is provided at the location of electrode 22 in the top fixed layer 135 with conductive path T1 provided therein. In this case the through-hole conductive path T1 is connected to wiring layer W4, which is connected to wiring layer W5 via through-hole conductive path T4. A through-hole is also formed at the location of electrode E11 in the bottom fixed layer 115 with conductive path T2 disposed therein. In this case the through-hole conductive path T2 is connected to wiring layer W6, which is connected to wiring layer W7 via through-hole conductive path T5. A solder bump 180 is further disposed on the top of wiring layer W7, and the top of this solder bump contacts wiring layer W5. As a result, wiring electrodes E11 and E22 in the circuit diagram shown in FIG. 13 can be completed by connecting wiring layer W7 to the input terminal of C/V conversion circuit 211.

It should be further noted that in the alternative version shown in FIG. 16 a protrusion 161 is formed on the bottom surface of the displacement layer 125. This is a protrusion resulting from welding the bottom of working body 160 to the top of the displacement layer 125 by means of electric welding, laser welding, or heat welding if the working body 160 is a resin material. If a protrusion 161 is thus formed on the bottom of the displacement layer 125 as a result of welding, a corresponding groove G is preferably formed in the top of the bottom fixed layer 115 so that when the displacement layer 125 is displaced the protrusion 161 does not contact the top of the bottom fixed layer 115.

Figure 17:
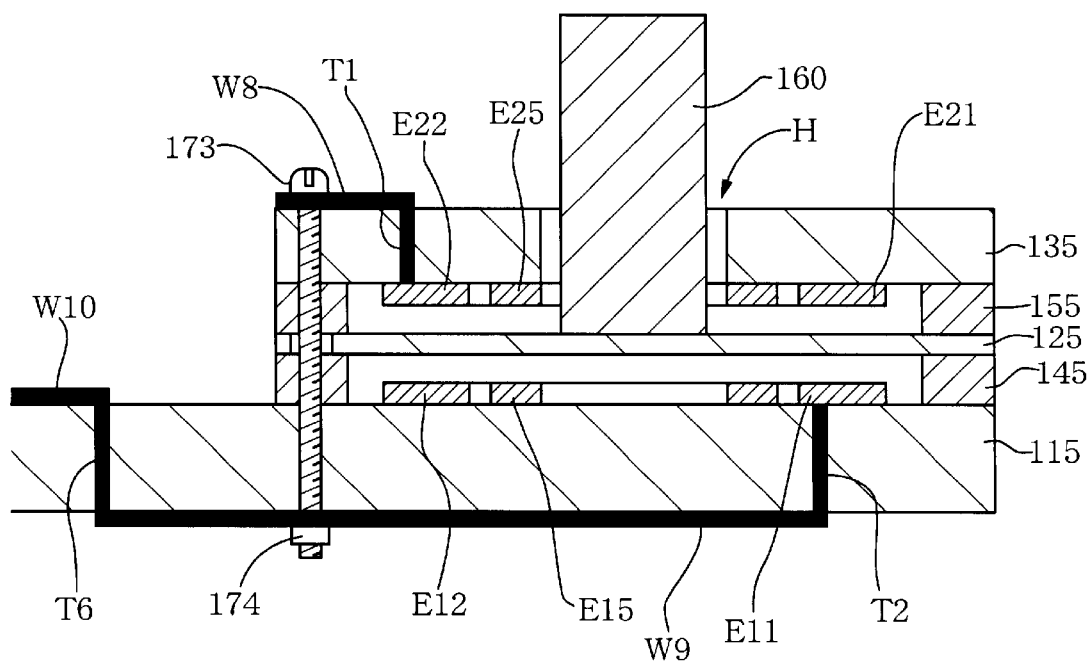
FIG. 17 is a side section view of yet further exemplary interconnects between electrodes for use with the sensor shown in FIG. 14.

FIG. 17 is a side section view of a further alternative version of the wiring example shown in FIG. 15. In this case a through-hole is provided at the location of electrode E22 in the top fixed layer 135 with conductive path T1 provided therein. In this case the through-hole conductive path T1 is connected to wiring layer W8. A through-hole is also formed at the location of electrode E11 in the bottom fixed layer 115 with conductive path T2 disposed therein. In this case the through-hole conductive path T2 is connected to wiring layer W9, which is connected to wiring layer W10 via through-hole conductive path T6.

The layers and pedestals are also firmly secured by bolt 173 and nut 174, which also provide conductivity between wiring layer W9 and wiring layer W9 in this case. As a result, wiring electrodes E11 and E22 in the circuit diagram shown in FIG. 13 can be completed by connecting wiring layer W10 to the input terminal of C/V conversion circuit 211.

It is to be noted that while the wiring for electrodes E11 and E22 only is shown and described in FIG. 15 to FIG. 17, electrodes E12 and E21, electrodes E13 and E24, and electrodes E14 and E23 are also interconnected in the same way, and the nodes between the electrode pairs are connected to the respective input terminals of C/V conversion circuits 212, 213, and 214.

It will also be obvious that while a nut and a bolt are shown connecting the layers and pedestals in FIGS. 15 to 17, a rivet can be alternatively used. In the version shown in FIG. 17, conductivity between wiring layers W8 and W9 can also be achieved using a rivet.

Although the present invention has been described in connection with the preferred embodiments thereof with reference to the accompanying drawings, it is to be noted that various changes and modifications will be apparent to those skilled in the art. For example, the shape of the electrodes shall not be limited to that shown in the figures for the above preferred embodiments of the invention, and the electrodes can be any desirable shape insofar as detection based on the principle of the present invention is possible.

The present invention has also be described with reference to an application to an acceleration detector, but as already noted above the invention can also be used in, for example, a force detector or a magnetic detector.

Such changes and modifications are to be understood as included within the scope of the present invention as defined by the appended claims, unless they depart therefrom.

What is claimed is:
1. A capacitance sensor using a capacitance element for detecting force or acceleration in a specific axis direction in an XYZ three-dimensional coordinate system having an X-axis, a Y-axis and a Z-axis, comprising:
   a bottom fixed layer and a top fixed layer fixed with a gap therebetween and with surfaces thereof parallel to an XY plane and intersected by the Z-axis;
   a displacement layer disposed between said bottom fixed layer and said top fixed layer so as to maintain a reference state substantially parallel to the XY plane under conditions in which a force or an acceleration is not at work, and to displace from said reference state when a force or an acceleration is at work;
   a working body connected to a part of said displacement layer for causing displacement of the displacement layer based on an action of force or acceleration;
   a positive X-axis bottom electrode formed on a top surface of the bottom fixed layer at a position corresponding to a positive region of the X-axis;
   a negative X-axis bottom electrode formed on a top surface of the bottom fixed layer at a position corresponding to a negative region of the X-axis;
   a positive X-axis top electrode formed on a bottom surface of the top fixed layer at a position corresponding to the positive region of the X-axis;
   a negative X-axis top electrode formed on a bottom surface of the top fixed layer at a position corresponding to the negative region of the X-axis;
   a displacement electrode formed on a bottom surface of the displacement layer at a position corresponding to the positive X-axis bottom electrode;
   a displacement electrode formed on a bottom surface of the displacement layer at a position corresponding to the negative X-axis bottom electrode;
   a displacement electrode formed on a top surface of the displacement layer at a position corresponding to the positive X-axis top electrode; and
   a displacement electrode formed on a top surface of the displacement layer at a position corresponding to the negative X-axis top electrode;
   where a positive X-axis bottom capacitance element is formed by the positive X-axis bottom electrode and an opposing displacement electrode;
   a negative X-axis bottom capacitance element is formed by the negative X-axis bottom electrode and an opposing displacement electrode;
   a positive X-axis top capacitance element is formed by the positive X-axis top electrode and an opposing displacement electrode;
   a negative X-axis top capacitance element is formed by the negative X-axis top electrode and an opposing displacement electrode; and
   a detection means having a function for detecting a force or an acceleration acting in an X-axis direction based on a difference between,
   a sum of a capacitance of the positive X-axis bottom capacitance element and a capacitance of the negative X-axis top capacitance element, and a sum of a capacitance of the negative X-axis bottom capacitance element and a capacitance of the positive X-axis top capacitance element.

2. A capacitance sensor as described in claim 1, wherein the bottom electrodes and the top electrodes are symmetrical to the XZ plane.

3. A capacitance sensor as described in claim 2, where the capacitance elements are all electrode pairs having the same shape, same size, and same electrode gap.

4. A capacitance sensor as described in claim 1, further comprising:
   a bottom origin-surrounding electrode formed around a point of origin on a top surface of the bottom fixed layer;
   a top origin-surrounding electrode formed around a point of origin on a bottom surface of the top fixed layer;
   a displacement electrode formed on a bottom surface of the displacement layer at a position opposing the bottom origin-surrounding electrode; and
   a displacement electrode formed on a top surface of the displacement layer at a position opposing the top origin surrounding electrode;
   where a bottom origin-surrounding capacitance element is formed by the bottom origin-surrounding electrode and an opposing displacement electrode, and
   a top origin-surrounding capacitance element is formed by the top-origin-surrounding electrode and an opposing displacement electrode; and
   the detection means has a further function for detecting force or acceleration acting in the Z-axis direction based on a difference between a capacitance of the bottom origin-surrounding capacitance element and a capacitance of the top origin-surrounding capacitance element.

5. A capacitance sensor as described in claim 4, wherein the bottom origin-surrounding electrode and the top origin-surrounding electrode are rotationally symmetrical to the Z-axis.

6. A capacitance sensor as described in claim 5, wherein the elements surround an origin of the coordinate system and are arranged in electrode pairs having the same shape, size, and electrode gap.

7. A capacitance sensor as described in claim 1, further comprising:
   a positive Y-axis bottom electrode formed on a top surface of the bottom fixed layer at a position corresponding to a positive region of the Y-axis;
   a negative Y-axis bottom electrode formed on a top surface of the bottom fixed layer at a position corresponding to a negative region of the V-axis;
   a positive Y-axis top electrode formed on a bottom surface of the top fixed layer at a position corresponding to the positive region of the Y-axis;
   a negative Y-axis top electrode formed on a bottom surface of the top fixed layer at a position corresponding to the negative region of the Y-axis;
   a displacement electrode formed on a bottom surface of the displacement layer at a position corresponding to the positive Y-axis bottom electrode;
   a displacement electrode formed on a bottom surface of the displacement layer at a position corresponding to the negative Y-axis bottom electrode;
   a displacement electrode formed on a top surface of the displacement layer at a position corresponding to the positive Y-axis top electrode; and
   a displacement electrode formed on a top surface of the displacement layer at a position corresponding to the negative Y-axis top electrode;
   where a positive Y-axis bottom capacitance element is formed by the positive Y-axis bottom electrode and an opposing displacement electrode;
   a negative Y-axis bottom capacitance element is formed by the negative Y-axis bottom electrode and an opposing displacement electrode;
   a positive Y-axis top capacitance element is formed by the positive Y-axis top electrode and an opposing displacement electrode; and
   a negative Y-axis top capacitance element is formed by the negative Y-axis top electrode and an opposing displacement electrode; and
   the detection means has a further function for detecting a force or an acceleration acting in a Y-axis direction based on a difference between,
   a sum of a capacitance of the positive Y-axis bottom capacitance element and a capacitance of the negative Y-axis top capacitance element, and
   a sum of a capacitance of the negative Y-axis bottom capacitance element and a capacitance of the positive Y-axis top capacitance element.

8. A capacitance sensor as described in claim 7, wherein the bottom electrodes and the top electrodes are symmetrical to the XZ plane or the YZ plane.

9. A capacitance sensor as described in claim 8, where the capacitance elements are all electrode pairs having the same shape, same size, and same electrode gap.

10. A capacitance sensor as described in claim 7, further comprising:
    a bottom origin-surrounding electrode formed around a point of origin on a top surface of the bottom fixed layer;
    a top origin-surrounding electrode formed around a point of origin on a bottom surface of the top fixed layer;
    a displacement electrode formed on a bottom surface of the displacement layer at a position opposing the bottom origin-surrounding electrode; and
    a displacement electrode formed on a top surface of the displacement layer at a position opposing the top origin-surrounding electrode;
    where a bottom origin-surrounding capacitance element is formed by the bottom origin-surrounding electrode and an opposing displacement electrode, and
    a top origin-surrounding capacitance element is formed by the top origin-surrounding electrode and an opposing displacement electrode; and
    the detection means has a further function for detecting force or acceleration acting in the Z-axis direction based on a difference between a capacitance of the bottom origin-surrounding capacitance element and a capacitance of the top origin-surrounding capacitance element.

11. A capacitance sensor as described in claim 10, wherein the bottom origin-surrounding electrode and the top origin-surrounding electrode are rotationally symmetrical to the Z-axis.

12. A capacitance sensor as described in claim 11, wherein the elements surround an origin of the coordinate system and are arranged as electrode pairs having the same shape, size, and electrode gap.

13. A capacitance sensor as described in claim 1, wherein a first part of the displacement layer is affixed to the bottom fixed layer and top fixed layer, a second part of the displacement layer is connected to the working body, a third part of the displacement layer located between the first part and second part is made of a flexible material such that displacement of the displacement layer occurs with deflection of the third part.

14. A capacitance sensor as described in claim 1, wherein a plurality of displacement electrodes formed on the displacement layer are comprised of a single physical common electrode.

15. A capacitance sensor as described in claim 14, wherein a flexible, conductive substrate is used as the displacement layer, and as the single common electrode.

16. A capacitance sensor as described in claim 14, wherein non-common electrodes of each capacitance element pair, for which a sum of capacitance values is obtained, are electrically connected to each other at a connection node, and a capacitance between said connection node and the common electrode is used as said sum.

17. A capacitance sensor as described in claim 16, wherein a through-hole is formed in the bottom fixed layer and the top fixed layer at each electrode connecting position, and a pair of electrodes are connected using a wiring layer by way of said through-hole.

18. A capacitance sensor as described in claim 1, wherein a perimeter of the bottom fixed layer and a perimeter of the top fixed layer are fastened by a pedestal, a perimeter of the displacement layer is fastened by said pedestal, the working body is connected to a top center part of the displacement layer, and a through-hole for passing through the working body is formed in a center part of the top fixed layer.

* * * * *